Patented Mar. 1, 1949

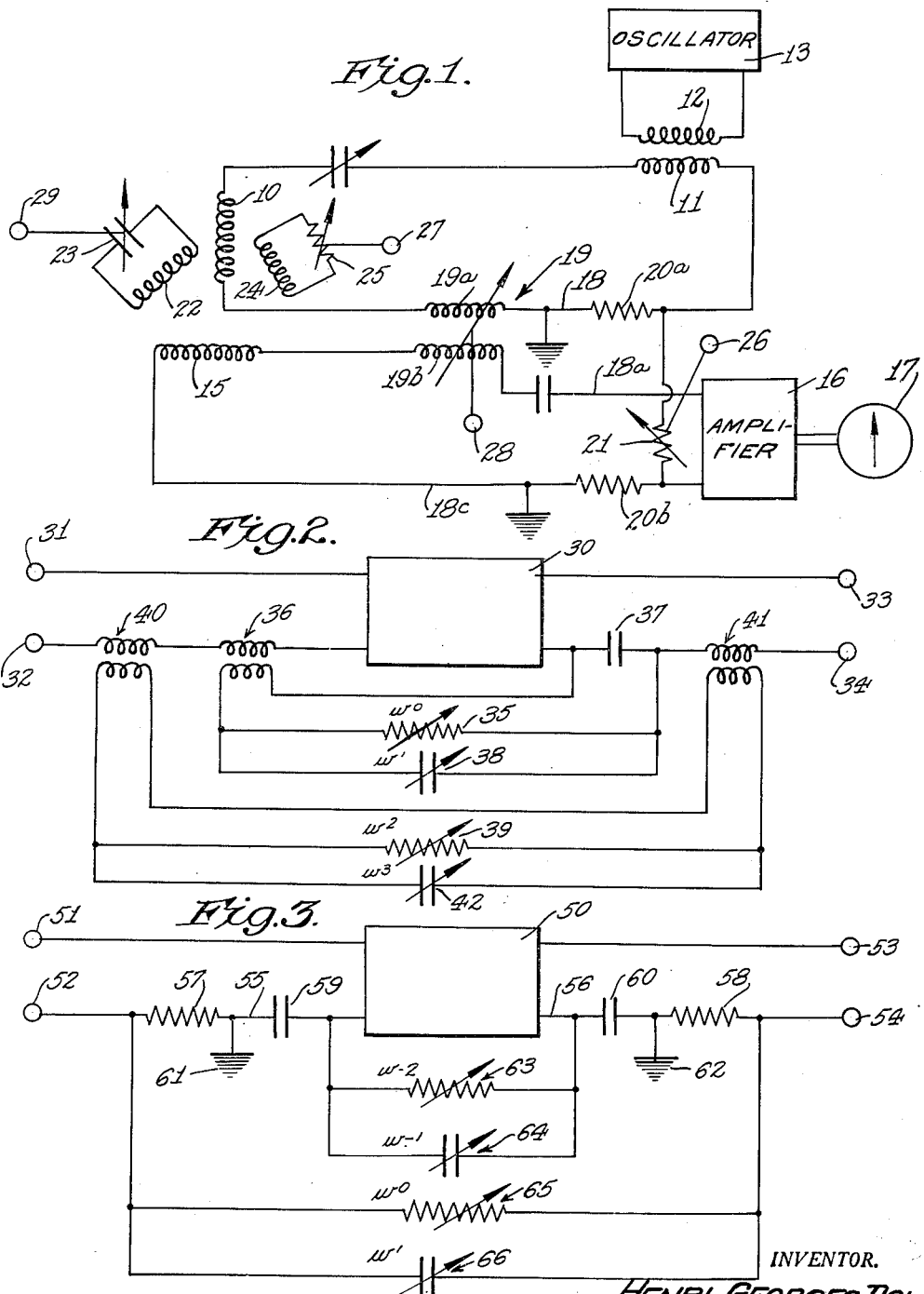

2,463,252

UNITED STATES PATENT OFFICE 2,463,252

FREQUENCY STABILIZATION OF ALTERNATING CURRENT NETWORKS

Henri-Georges Doll, Houston, Tex., assignor to Schlumberger Well Surveying Corporation, Houston, Tex., a corporation of Delaware Application March 8, 1946, Serial No. 653,184

11 Claims. (Cl. 323—75)

This invention relates to alternating current networks, and it relates particularly to methods of and apparatus for balancing such networks for use at one frequency and frequencies close to that frequency or for use at two different frequencies, for example, for the operating frequency and its second harmonic.

A typical form of alternating current network is an alternating current bridge. A common use of such an alternating current bridge is the detection of land mines. Such mine detecting bridges must be of relatively simple and rugged construction in order to withstand shock and severe climatic conditions, and as a consequence the oscillator for energizing the bridge usually is not sufficiently closely controlled to maintain it at a precise and fixed frequency. If the frequency of the oscillator changes or drifts, as is quite common, the network tends to become unbalanced, thereby necessitating rebalancing to prevent spurious signals and loss of sensitivity.

Some of the drifts and corresponding unbalance of the bridge may be caused by changes in the resistance, inductance or capacity of or between the elements of the system. Other more complex variations may result from variations in frequency. Such changes in frequency modify the effects of mutual inductances, mutually coupled resistances and mutually coupled capacities, in different degrees. They may also affect the coupling between the transmitting or input circuit and the receiving or output circuit, which may be inductive, resistive or capacitative, or any combination thereof. For example, coupling may take place with metallic parts or the like on the supporting frame of the coils of a mutual impedance bridge or in the vicinity thereof. Generally, the effect of a mutual resistance in the system is independent of the frequency of the current in the network, while the effect of a mutual inductance varies directly with the frequency. The effects produced by mutually coupled resistances vary generally as the square of the frequency. The effects produced by mutually coupled capacities vary generally as the cube of the frequency. Therefore, if the frequency of the oscillator varies, any one or all of the above indicated factors may vary in different degrees. Not only that, but several variations may occur in each of the above general classes, each tending to unbalance the system so that the change in frequency may introduce unbalancing factors in different degrees from zero power to the third power of the frequency or even higher or lower.

Inasmuch as it is difficult, if not impossible, to determine the cause of the unbalance of the bridge that results from a change in frequency, it is usually impossible to calculate the value of a corrective factor or factors necessary to restore balance to the bridge.

I have discovered that it is possible to compensate for all of the variables of a system at one frequency and at frequencies close to that frequency, that is, for example, that frequency plus or minus about 5%, or for two substantially different frequencies by means of relatively simple balancing means that can be manipulated in a simple way.

The balancing means provided in accordance with the present invention makes possible the use of relatively simple and rather coarsely regulated oscillators in alternating current networks without necessitating the constant rebalancing of the network as the frequency of the oscillator slowly drifts. Also, the invention makes it possible to balance the bridge network simultaneously for two frequencies. The balancing system embodying the invention is most advantageous for use in alternating current bridges and for detecting land mines since it makes possible the use of a rugged and simple oscillator in a single frequency bridge. It is also very useful when a bridge is to be used at two frequencies and, therefore, must be balanced simultaneously for the two frequencies.

For a better understanding of the present invention, reference may be had to the accompanying drawing in which:

Figure 1 is a schematic wiring diagram of a typical form of alternating current mutual impedance bridge embodying the present invention;

Figure 2 is a schematic diagram of a four-terminal alternating current network illustrating the invention; and Figure 3 is a schematic diagram of a four-terminal alternating current network including controls for balancing the network for components in proportion to the minus second power of the frequency, the minus first power of the frequency, zero power of the frequency and the first power of the frequency.

The invention described hereinafter is useful in many different types of alternating networks wherein it is important that the network remain in balance without substantial alteration of its characteristics when the frequency of the currents in the bridge vary slightly, and it is particularly useful in connection with alternating current bridges which are used for investigating various materials or making geophysical surveys. The invention is described hereinafter as embodied in an alternating current mutual impedance bridge and in four-terminal alternating current networks.

As shown in Figure 1, a typical mutual impedance bridge may include a transmitting coil 10 which is inductively coupled by means of the mutual inductances or transformer windings 11 and 12 to a variable frequency oscillator 13.

Associated with the coil 10 is a receiving coil 15, which, as illustrated, may be disposed with its axis perpendicular to the axis of the coil 10 so that the mutual inductance between these coils is zero or substantially so. The coil 15 is connected to a suitable amplifier 16 which in turn may be connected to an indicator 17 such as a meter. The conductors 18 and 18a connecting one end of the coil 10 and one end of the coil 15 to the oscillator and the amplifier, respectively, may contain the windings 19a and 19b of a variometer 19. A resistance network is provided including the resistance 20a and the resistance 20b connected, respectively, in the conductors 18 and 18c between the oscillator 13 and ground and the amplifier 16 and ground, and a variable resistance 21 connected across the resistors 20a and 20b.

A variometer 19 may be used in such an alternating current bridge in order to balance it for inductive effects when using an oscillator having a single frequency. By suitably adjusting the variometer 19 and the variable resistance 21, it is possible to balance the bridge so long as the frequency remains constant. However, if the frequency of the oscillator varies, the bridge becomes unbalanced and the variable resistance 21 and the variometer 19 must be adjusted to restore the bridge to proper balance. On the other hand, if a current of a second frequency is present in the bridge, for example, a harmonic of the fundamental frequency, the bridge is not balanced for the harmonic frequency unless the resistance 21 and the variometer 19 are adjusted to suitable values for balancing the harmonic frequency, in which case they will not balance the bridge for the fundamental frequency.

The unbalance of the bridge may be due to mutual resistances, mutual inductances, or mutual capacities between the transmitting and receiving circuits.

As the different E. M. F.'s induced in the receiving circuit, which shall be referred to as components hereinafter, the combination of which constitute the unbalance, respectively depend upon various powers of the oscillator frequency, other means must be provided in order to compensate for drifts or variations produced by these variables if the bridge is to be rendered insensitive to small drifts in frequency or if two different frequencies have to be balanced simultaneously in the bridge. Inasmuch as it is not possible ordinarily to determine the values or the kinds of variables that may be affected by the frequency, it is not possible to provide means for compensating individually for the effects of all of these variables. However, I have found that for ordinary purposes it is possible to compensate for most of the variables by providing two additional compensating or balancing elements. Through the use of the variometer 19, the variable resistance 21, and these two other balancing means hereinafter described, it is possible either to balance the bridge for one frequency and for frequencies close to that frequency so that small changes in frequency have little effect, or none, on the balance of the bridge, or, if preferred, to balance it for two different frequencies.

One of the additional compensating or balancing elements may consist of a circuit coupled through the winding 22 to the transmitter and receiving coils 10 and 15. A variable condenser 23 is connected to the winding 22. The winding 22 may be positioned in such relationship to the coils 10 and 15 or adjacent to both of the coils 10 and 15 that it is inductively coupled to the coils 10 and 15. It can also be separated into two parts, one coupled with the coil 10, and the other part coupled with the coil 15. The capacity of this circuit can be varied by changing the setting of the condenser 23 and thus may be used to compensate for mutually coupled capacity effects in the system. Thus the mutually coupled capacities in the system and the compensating means comprising the winding 22 and the condenser 23 will be affected equally by changes in frequency and when balanced properly will remain in balance at different frequencies.

In order to compensate for mutually coupled resistive effects in the system, a similar winding 24 is provided having variable resistance 25 connected across the winding. The winding 24 is also positioned in such relation to the coils 10 and 15 that it is inductively coupled therewith.

The variable resistance 21, the resistance 25 connected to the winding 24, the variometer 19, and the condenser 23 may be adjusted by means of suitable control knobs 26, 27, 28, and 29, respectively.

The components that are controlled by the resistance 21 and the resistance 25 are resistive components. The component corresponding to the resistance 21 is independent of frequency, while the component corresponding to the resistance 25 varies as the square of the frequency.

The components that are controlled by the variometer 19 and the capacity 23 are inductive components. The component controlled by the variometer 19 varies directly as the frequency, while the component controlled by the capacity 23 varies as the cube of the frequency.

As indicated above, the various compensating elements including the variometer 19, the resistance 21, the condenser 23, and the variable resistance 25 are used to maintain the bridge in balanced condition when small changes in frequency of the signal in the system occur. Inasmuch as it is impossible, under ordinary conditions, to determine the factor causing bridge unbalance, it is likewise impossible to know which compensating means should be adjusted and to what extent. In order to accomplish the quick rebalancing of the bridge, it is necessary to follow a definite pattern of adjustment in order to make certain that the four controllable factors affecting the balance of the bridge are compensated for. In practice, two frequencies will be selected in the vicinity of the desired frequency, for example, one slightly lower and one slightly higher than the desired frequency, and the controls will be adjusted for these two frequencies, whereby the bridge will also be practically balanced for the desired frequency.

The oscillator 13 will be set into operation at the lower of two desired frequencies, and the bridge balanced by adjustment of the control knobs 26 and 28, that is, by adjusting the resistance 21 and the variometer 19. When this has been accomplished, the oscillator 13 is adjusted to operate at the higher of the two desired frequencies, with the result that the bridge in all probability will become unbalanced.

The resistance 25, which is mutually coupled with the coils 10 and 15, should be adjusted with the knob 27, but it is not enough to turn that knob until the resistive part of that unbalance is compensated and a minimum is reached. In fact, the knob should be turned farther in the same direction than is necessary to obtain a minimum deflection.

To clarify the explanation, it will be assumed that the two frequencies for which a balance is to be effected differ from each other by 10%. It will be assumed also that an unknown component proportional to the square of the frequency is present and has been compensated for by error in the first balancing of the bridge at the lower frequency by a component independent of frequency such as can be introduced into the bridge by means of the resistance 21. When the frequency is increased by 10%, the unknown component increases by about 20%, while the component used to balance it remains unchanged. The resistive unbalance which appears when going to the higher frequency represents, therefore, an increase of about 20% of the component proportional to the square of the frequency which it is intended to compensate entirely by means of the mutually coupled resistance 25 which also gives components proportional to the square of the frequency. If the operator simply nullified the resistive unbalance which has appeared in the bridge when going from the lower to the higher frequency, he would only compensate for about one-sixth of the component which is proportional to the square of the frequency with the control 25, and leave five-sixths of it compensated by resistance 21. As a result, the bridge would still be sensitive to frequency changes for the resistive component. Therefore, in order to compensate not only for the one-sixth required to bring the indicator to a minimum, but for all or most of the other five-sixths as well, the operator should turn the knob 27 approximately five times farther in the same direction.

This will result, of course, in a deflection of the meter due to the component which was introduced by the control 21 and which previously compensated for the said five-sixths. The operator will, therefore, have to turn the control 21, that is, knob 26, until a minimum deflection is observed which means that the resistive component is now compensated for at the higher frequency. After these corrections have been made, the bridge is again energized at the lower frequency by means of the oscillator 13, with the result that the bridge may be again unbalanced as indicated by the deflection of the indicator 17. The resistive part of the unbalance is then compensated for by overadjusting the resistance 21 by turning the knob 26 about six times as far as would be required to return the indicator to a minimum. This overadjustment is then compensated for by turning the knob 27 to reduce the deflection of the indicator to a minimum. This procedure is repeated alternately at the lower and the higher frequency until further adjustments do not appear to produce much change. Any residual unbalance then is due to components in quadrature to the components that have been balanced already.

It is now possible to balance the inductive components by a similar procedure, but using the two knobs 28 and 29 which give control inductive components, respectively, proportional to the first and to the third power of the frequency. To that effect, the bridge is balanced to zero or a minimum using the knob 28, at the lower frequency. The oscillator 13 is then shifted to the higher frequency and a correction made by turning the knob 29 about five times farther than is required to reduce the deflection of the indicator 17 to a minimum. The deflection of the indicator due to overshooting is then reduced to a minimum by adjustment of the variometer 19 by turning the knob 28.

The oscillator is then energized at the lower frequency and adjustment is made by overshooting with the variometer 19, followed by readjustment with the capacity 23. These operations are repeated until the indicator shows a minimum deflection when the frequency of the oscillator 13 is shifted from the lower valve to the higher valve.

The amount of overshooting during the compensating operations is dependent upon the differences between the oscillator frequencies used in the bridge. Thus, if the higher frequency is twice the lower frequency, as in the case of a fundamental frequency, and a harmonic thereof, it is only necessary to overshoot the minimum by about one-third the amount required to restore the indicator to a minimum.

In these compensating operations, a definite pattern of adjustments is followed. Thus, when compensating at the higher frequency, the circuit component having the higher power of the frequency for the component being compensated should be adjusted first and overshot, as explained above, while, at the lower frequency, the circuit component having the lower power of the frequency should be adjusted and overshot. At the higher frequency, the mutually coupled resistance 25 should be adjusted first and overshot to compensate for resistive component variations; the resistance 21 should be adjusted first and overshot at the lower frequency to compensate for resistive components; the capacity 23 should be adjusted first and overshot at the higher frequency to compensate for mutually coupled inductive components; and the variometer 19 should be adjusted first and overshot at the lower frequency to compensate for mutual inductive components.

It will be understood that the adjustment of the bridge for resistive components while an inductive unbalance is present may not be as accurate as is desired, and, therefore, after the inductive components have also been compensated, the balance of the resistive components may be refined by readjusting with the resistances 21 and 25, as explained above. Thereafter, the adjustment of the inductive components can be refined in the same way. The process can be repeated on the resistive and inductive components until no appreciable unbalance appears when going from one frequency to the other.

The frequency is then shifted to the operating frequency which might or might not be one of the two frequencies selected for adjustment, and the zero of the bridge is readjusted by means of either one of the two resistive controls and either one of the two inductive controls.

The above described system and method are equally useful in balancing four-terminal alternating current networks of other types. Also, other types of balancing circuits may be used in such balancing systems. For example, as shown in Figure 2, an alternating current network 30 having the input terminals 31 and 32 and the output terminals 33 and 34 may be balanced for components independent of frequency and the first, second and third powers of the frequency.

The control for balancing for resistive components that are independent of frequency may consist of a variable resistance 35 that is inductively coupled by a transformer 36 to the input of the four-terminal network 30 and across a capacity 37 between the network 30 and the output terminal 34. The impedance of the resistance 35 must be high as compared to the impedance of the condenser 37 and the impedance of the transformer 36.

The control for the inductive components that are directly proportional to frequency may consist of a variable condenser 38 coupled to the input and output of the network 30. The impedance of this condenser should preferably be high with respect to the impedance of the condenser 37 and the impedance of the transformer 36.

The control for balancing resistive components that are proportional to the square of the frequency may consist of a variable resistance 39 that is inductively coupled to the input and output of the network 30 through transformers 40 and 41.

The control for balancing inductive components that are proportional to the cube of the frequency may consist, as described above, of a variable capacitance 42 that is inductively coupled to the input and the output of the network 30 through transformers 40 and 41. The impedance of the resistance 39 and the condenser 42 should preferably be high with respect to the impedance of the transformers 40 and 41.

These controls may be adjusted in the manner described above to balance the circuit for components which are proportional to the various powers of the frequency to which they correspond.

In some cases, it may be desirable to compensate for, or nullify the effects of, components that are proportional to powers of the frequency such as the minus second or minus first power of the frequency, as well as others.

Figure 3 illustrates a system in which compensation can be made in an alternating current network 50 for components proportional to the minus second, minus first, zero, and first powers of the frequency.

The circuit 50 has the input terminals 51 and 52 and the output terminals 53 and 54. The conductors 55 and 56 connecting the terminals 52 and 54, respectively, to the system 50 are provided with the resistances 57 and 58, the capacities 59 and 60 and the interposed grounds 61 and 62.

The control for the resistive component corresponding to the minus second power of the frequency may consist of a variable resistance 63 connected through the capacities 59 and 60 to ground.

The control for the inductive component proportional to the minus first power of the frequency may consist of a variable capacity 64 coupled to the input and the output of the network 50 in the same manner as the resistance 63. The impedance of both the resistance 63 and the capacity 64 should preferably be high with respect to the impedances of the capacities 59 and 60.

The control for the resistive component that is independent of frequency may consist of a variable resistance 65 that is coupled to the input and the output of the network 50 through the resistances 57 and 58 and the common grounds 61 and 62.

The control for the inductive component that is proportional to the first power of the frequency, and which in Figure 1 has been represented by a variometer between the input and output circuits, consists in Figure 3 of a variable condenser 66 coupled to the input and the output of the network in the same manner as the variable resistance 65.

The impedances of the resistance 65 and the capacity 66 preferably should be high with respect to the impedances of the resistances 57 and 58 in order not to impair the phase of each of the controls and keep them independent.

The above described systems and method can be used for balancing bridges in which the wave form for the frequency is not sinusoidal and, therefore, has harmonics that should be nullified simultaneously with the fundamental frequency. In this case, as well as in others, the network may be energized at both frequencies simultaneously and compensations are made by referring to a frequency selective meter, or by listening to the different frequencies, selectively, with headphones. Also, it can be used for balancing systems which are operated intentionally at two frequencies which are not necessarily harmonics of each other.

The balancing system is particularly suitable for maintaining in balance an alternating current system utilizing an oscillator that varies slightly from a fixed frequency inasmuch as the compensations are sufficiently complete to allow such slight variations in frequency of the oscillator without producing any appreciable unbalance.

The method for obtaining balance in an alternating current bridge which is unaffected or little affected by frequency changes has been disclosed in detail in the case where four controls are used, namely, two controls of a first phase respectively responsive to two powers of the frequency and two controls of a second phase preferably in quadrature with the first phase, also respectively responsive to two powers of the frequency. The balance obtained will be perfect if the initial unbalance which had to be compensated contained only components of each phase respectively responsive to the same powers of the frequency as the two controls of the corresponding phase. For example, the initial unbalance may contain only two categories of resistive components respectively responsive to the zero power and to the second power of the frequency and two categories of inductive components respectively responsive to the first power and to the third power of the frequency. In this case an adjustment obtained as explained above with two controls giving resistive components respectively responsive to the zero of second power of the frequency and two controls giving inductive components respectively responsive to the first and the third power of the frequency will be good for all frequencies and not only in the immediate vicinity of one frequency. It is only if the different components of the initial unbalance are not responsive to the same powers of the frequency as the different controls that the balance is good only for the limited range of frequencies for which the adjustment has been made, the adjustment having in this case, as said before, for its effect to nullify at a chosen frequency the unbalance and the first derivatives of its two phase components with respect to frequency.

When three components of the resistive phase are present in the initial unbalance, respectively responsive, for example, to the zero, second and fourth power of frequency, as well as three inductive components respectively responsive, for example, to the first, third and fifth power of the frequency, it is still possible to obtain a balance which is good for all frequencies provided that six controls are used corresponding respectively for phase and responsiveness to frequency to the different components of the initial unbalance. Thus, the system should include three controls giving resistive component respectively responsive to the zero, the second and the fourth power of frequency as well and three other controls giving inductive components respectively responsive to the first, third and fifth power of frequency, any of these controls being easy to construct to anyone skilled in the art.

The alternating current network to be balanced will be provided with means making it possible to alternately supply to the input currents of three different frequencies, hereinafter referred to as lower, medium and higher frequencies.

The balancing operations in this case will be very similar to those in the case of only four controls described before. In a first series of balancing operations, the medium frequency will be ignored, as well as the resistive control responsive to the intermediate power of the frequency, that is, the second power of the frequency, and the induction control responsive to the other intermediate power of the frequency, that is, the third power of the frequency. The system being thus temporarily reduced to two frequencies, namely, the lower and the higher, and two controls for each phase, is operated exactly as described heretofore until a balance is obtained which is unaffected by changing from one to the other of these two frequencies. At this time the medium frequency is used, and generally an unbalance appears. This unbalance is nullified by using only the controls, one of them of resistive phase, the other of inductive phase, which correspond to the intermediate powers of the frequency and which had purposely been ignored in the first series of balancing operations. These two controls are used concurrently and alternately until a minimum unbalance is obtained. The whole cycle of operations is then repeated until the balance obtained holds for all three frequencies.

If the initial unbalance contains more than three components of each phase respectively responsive to different powers of the frequencies, and/or if some of these components are responsive to powers of the frequency to which no control of the corresponding phase is responsive, the balance obtained, as described above, will be good for the three specific frequencies used, but may be slightly affected for other frequencies although less than in the case when only two controls for each phase had been used. If the three frequencies are close to each other, that is, for example, the lower 5% lower than the medium, the higher 5% higher than the medium, the balancing operation as described has substantially for its result to nullify at the medium frequency the out-balance, as well as its first and second derivatives with respect to frequency. It will be evident for anyone skilled in the art that this balance will, therefore, be more stable with respect to frequency than the one that could have been obtained with only four controls, in which case the unbalance and only its first derivative would have been nullified.

The above described system which makes it possible to balance simultaneously for three frequencies can in particular be used in a bridge network which it is desired to balance simultaneously for a fundamental frequency and two different harmonics of said frequency, which might be desirable, for example, to obtain a better zero reading when no filtering means are available or can be used in the output. It is also useful when three frequencies have to be used simultaneously for any other reason.

It will be obvious that even more than three controls can be used to compensate for any given phase in the unbalance, and that, therefore, it is possible either to simultaneously balance an alternating current bridge for more than three frequencies, or to nullify simultaneously for any given frequency not only the unbalance but more than its two first derivatives as well, for example, the first, second, and third derivatives with respect to frequency.

It will be understood from the foregoing description that the system described above is illustrative only and is susceptible to wide modification without departing from the invention. Therefore, the above described embodiment of the invention should not be considered as limiting the scope of the following claims.

I claim:

1. A system for balancing simultaneously for more than one frequency an alternating current network having an input and an output, said output being unbalanced by changes in frequency, comprising means to supply current to said input at more than one frequency, two compensating means for introducing into said output two components of a first phase which are respectively proportional to two different powers of the frequency, and two other compensating means for introducing into said output components of a second phase different from said first phase, the last mentioned component being respectively proportional to two different powers of the frequency.

2. A system for balancing for more than one frequency a mutual impedance bridge having a transmitting coil and a receiving coil system, comprising two compensating means each coupled with both of said coil systems for introducing into said receiving coil system components of a first phase which are respectively proportional to two different powers of the frequency, and two other compensating means each coupled with both of said coil systems for introducing into said receiving coil system components of a second phase different from said first phase, the last mentioned components being also proportional to two different powers of the frequency.

3. A system for balancing simultaneously for more than one frequency an alternating current network having an input and an output, comprising means to supply current at more than one frequency to said input, two first compensating means for introducing in said output two components substantially in phase with said current which are respectively proportional to two different powers of the frequency, and two other compensating means for introducing into said output components substantially in phase quadrature with said current which are also respectively proportional to two different powers of the frequency.

4. A system for balancing simultaneously for more than one frequency an alternating current network having an input and an output, comprising means to supply current at more than one frequency to said input, two first compensating means for introducing into said output two components in phase with said current, said components being respectively independent of the frequency and proportional to the square of the frequency, and two other compensating means for introducing into said output two other components in phase quadrature with said current, said other components being respectively proportional to the frequency and to the third power of the frequency.

5. A system for balancing for more than one frequency a mutual impedance bridge having a transmitting coil system and a receiving coil system, comprising means for supplying current to said input at a first phase and more than one frequency, two compensating means each coupled with both of said coil systems for introducing into said receiving coil system components of a first phase which are respectively proportional to two different powers of the frequency, and two other compensating means each coupled with both of said coil systems for introducing into said receiving coil system components of a second phase in quadrature with said first phase different from said first phase, the last mentioned components being also proportional to two different powers of the frequency.

6. A system for balancing for more than one frequency a mutual impedance bridge having a transmitting coil and a receiving coil, means for supplying a current at more than one frequency and at a first phase to said transmitting coil, two compensating means for supplying to said receiving coil two components at said first phase, said components being, respectively, independent of the frequency and proportional to the square of the frequency, and two other compensating means for supplying two other components at a second phase in quadrature with said first phase, said two other components being respectively proportional to the frequency and proportional to the cube of the frequency.

7. A system for balancing an alternating current bridge network having an input and an output at one frequency and for rendering said balance unaffected by small changes of the frequency around said one frequency, comprising means to supply current to said input alternately at said one frequency and at at least one other frequency close to said one frequency, two compensating means for introducing into said output two components of a first phase which are respectively proportional to two different powers of the frequency, and two other compensating means for introducing into said output components of a second phase different from said first phase, the last mentioned components being respectively proportional to two different powers of the frequency.

8. A system for balancing an alternating current bridge network having an input and an output in which frequency changes around the desired operating frequency produce unbalance in the output having a definite phase with respect to the current energizing the input, and for rendering said balance unaffected by small changes of the frequency around said operating frequency, comprising means to supply current to said input alternately at said operating frequency and at at least one other frequency close to said one frequency, two compensating means for introducing into said output two components having said definite phase which are respectively proportional to two different powers of the frequency, and at least one other compensating means for introducing into said output components in phase quadrature with said definite phase.

9. A method of balancing an alternating current network having an input and an output for one operating frequency and frequencies close to said operating frequency, comprising alternately supplying two alternating currents to said input respectively at a lower and at a higher testing frequency, both of these testing frequencies being close to the operating frequency, introducing into said output two balancing components of a first phase which are respectively proportional to a higher and a lower power of the frequency to balance said first phase in the output, and experimentally modifying the proportion in which said two balancing components of said first phase are combined to balance said first phase by testing alternately at said two testing frequencies until the balance obtained for said first phase remains unaffected when the frequency is changed from one of said two testing frequencies to the other testing frequency, and thereafter introducing into said output two balancing components of a second phase which are respectively proportional to a higher and a lower power of the frequency to balance said second phase in the output, and experimentally modifying the proportion in which said two balancing components of said second phase are combined to balance said second phase by testing alternately at said two testing frequencies until the balance obtained for said second phase remains unaffected when the frequency is changed from one of said two testing frequencies to the other testing frequency.

10. A method for balancing an alternating current network having an input and an output for two different frequencies, comprising alternately supplying two alternating currents to said input, one of said currents having one of said frequencies and the other current having the other frequency, introducing into said output two components of a first phase which are respectively proportional to a higher and a lower power of the frequency to balance said first phase in said output, modifying the proportion in which said two components are combined to balance said first phase by testing alternately at said two frequencies until the balance obtained for said first phase remains unaffected when the frequency is changed from one to the other of said frequencies, thereafter introducing into said output two other balancing components of a second phase which are respectively proportional to a higher and a lower power of the frequency, and modifying the proportions in which said two other components of said second phase are combined to balance said second phase by testing alternately at said two frequencies until the balance obtained for said second phase remains unaffected when the frequency is changed from one of said frequencies to the other frequency.

11. A method of balancing an alternating current network having an input and an output for two different frequencies, comprising supplying two alternating currents to said network, one of said currents having the lower of said frequencies and the other current having the higher of said frequencies, successively introducing into said network two components of a first phase which are respectively proportional to a higher and a lower power of the frequency while said network is supplied with alternating current at each of said higher and said lower frequencies, said component proportional to the higher power being introduced first at the higher frequency, and said component proportional to the lower power being introduced first at the lower frequency, and thereafter successively introducing into said network two other components of a second phase different from said first phase which are respectively proportional to a higher and a lower power of the frequency, while said network is supplied with alternating current at each of said higher and said lower frequencies, said other component proportional to said higher power being introduced first at said higher frequency, and said other component proportional to said lower power being introduced first at said lower frequency.

HENRI-GEORGES DOLL.

No references cited.